Oct. 15, 1968  C. B. GRADY, JR., ET AL  3,405,775
WEIGHING MECHANISM

Filed Aug. 19, 1965  2 Sheets-Sheet 1

INVENTORS
Charles B. Grady
Nathaniel B. Wales Jr.

Oct. 15, 1968    C. B. GRADY, JR., ET AL    3,405,775
WEIGHING MECHANISM
Filed Aug. 19, 1965    2 Sheets-Sheet 2
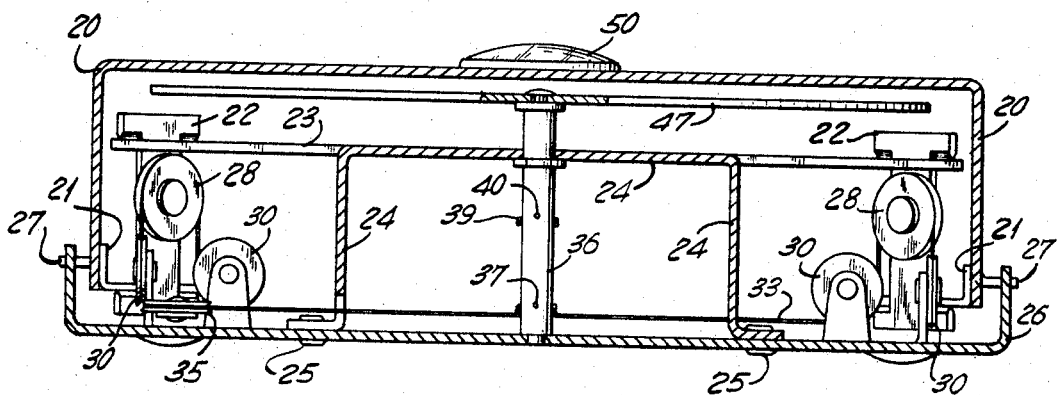
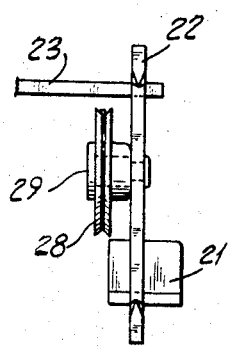
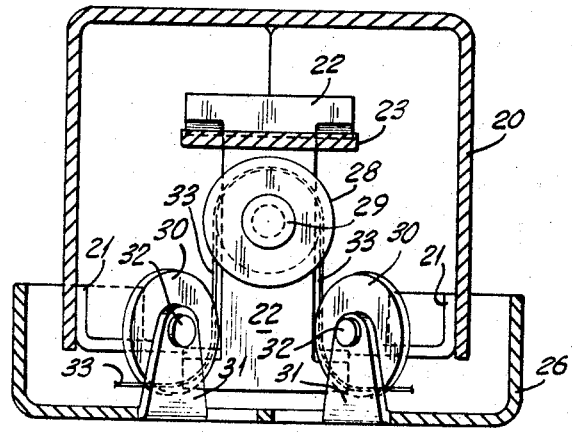
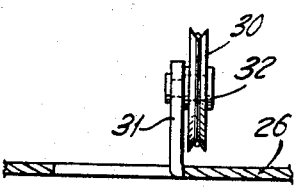
INVENTORS
Charles B. Grady
Nathaniel B. Waler

3,405,775
WEIGHING MECHANISM

Charles B. Grady, Jr., West Orange, N.J., and Nathaniel B. Wales, Jr., New York, N.Y., assignors to The Metrodynamics Corporation, Red Bank, N.J., a corporation of New Jersey
Filed Aug. 19, 1965, Ser. No. 480,872
3 Claims. (Cl. 177—229)

ABSTRACT OF THE DISCLOSURE

A weighing platform is supported at points near its edges by a plurality of springs preferably cantilever beams stamped from a single plate. The sum of the deflections of these springs is mechanically derived by a pulley circuit threaded by a tape or cable which serially spans each spring deflection path, and indicates this total weighing deflection on a rotary display dial to which the cable is coupled under spring tension.

---

This invention relates to a weighing mechanism in which the deflections of a plurality of independent cantilever beams, collectively supporting the load to be weighed are mechanically added to indicate or register the total weight.

In the weighing device art it is common practice to support the load to be weighed on a plurality of rigid levers journaled on strap supports or knife edges, and then to combine the several reduced lever forces by whiffle-tree type adding levers until a single force proportional to the total load is available for balancing against a spring or an adjustable weight. However, this approach requires great mechanical precision to maintain an exact constancy of the lever ratios. Further, due to the transmission of these weighing forces through so many pivots, any friction in these pivots will impair the accuracy and reproducibility of such a device. Also, such devices are sensitive to the location of the load on their weighing platforms.

The present invention avoids these impediments to the manufacture of an inexpensive and yet accurate weighing device, by directly supporting a weighing platform on a plurality of cantilever beams which preferably are stamped from a single sheet of sheet metal. Depending on the location of the center of gravity of the load on the platform, these beams will deflect, in general, to different degrees in such a way that the sum of these deflections will have a value proportional to the weight of the total load. This invention then teaches the mechanical addition of these deflections by a serial pulley circuit traversed by an inextensible wire or tape which visits the tip of each beam in turn via the pulley circuit. By maintaining a constant predetermined tension on the foregoing flexible inextensible tension member, a total displacement will be generated which will be proportioned to the sum of the beam deflections, and thus to the total weight on the platform. This displacement may then be mechanically or optically magnified to provide a display or register of this result.

A feature of the foregoing stamped beam design is that by using a coining type of stamping die, the thickness and therefore spring rate of the beam can be accurately controlled and at low cost.

It is the principal object of this invention to provide a weighing platform design which will give accurate, reproducible weight readings insensitive to the location of the load on its platform, and yet one which can be manufactured inexpensively due to its simplicity.

Another object of the invention is to provide a weighing device which distributes the load between a plurality of springs, and which measures the sum of the deflections of said springs.

Still another object of the invention is to provide a weighing platform design in which the deflection springs are formed from a single sheet of metal.

A further object of the invention is to provide a weighing machine design in which deflections instead of forces are added.

For other objects and a clearer understanding of this invention reference is made to the following detailed specification which is to be taken in conjunction with the accompanying drawings, in which:

FIGURE 2 is a transverse view in elevation taken through the plane 2—2 of FIGURE 1;

FIGURE 3 is an enlarged elevational view taken through the plane 3—3 of FIGURE 1;

FIGURE 4 is a view through plane 4—4 of FIGURE 1; and

FIGURE 5 is a view through plane 5—5 of FIGURE 1.

Figure 1:
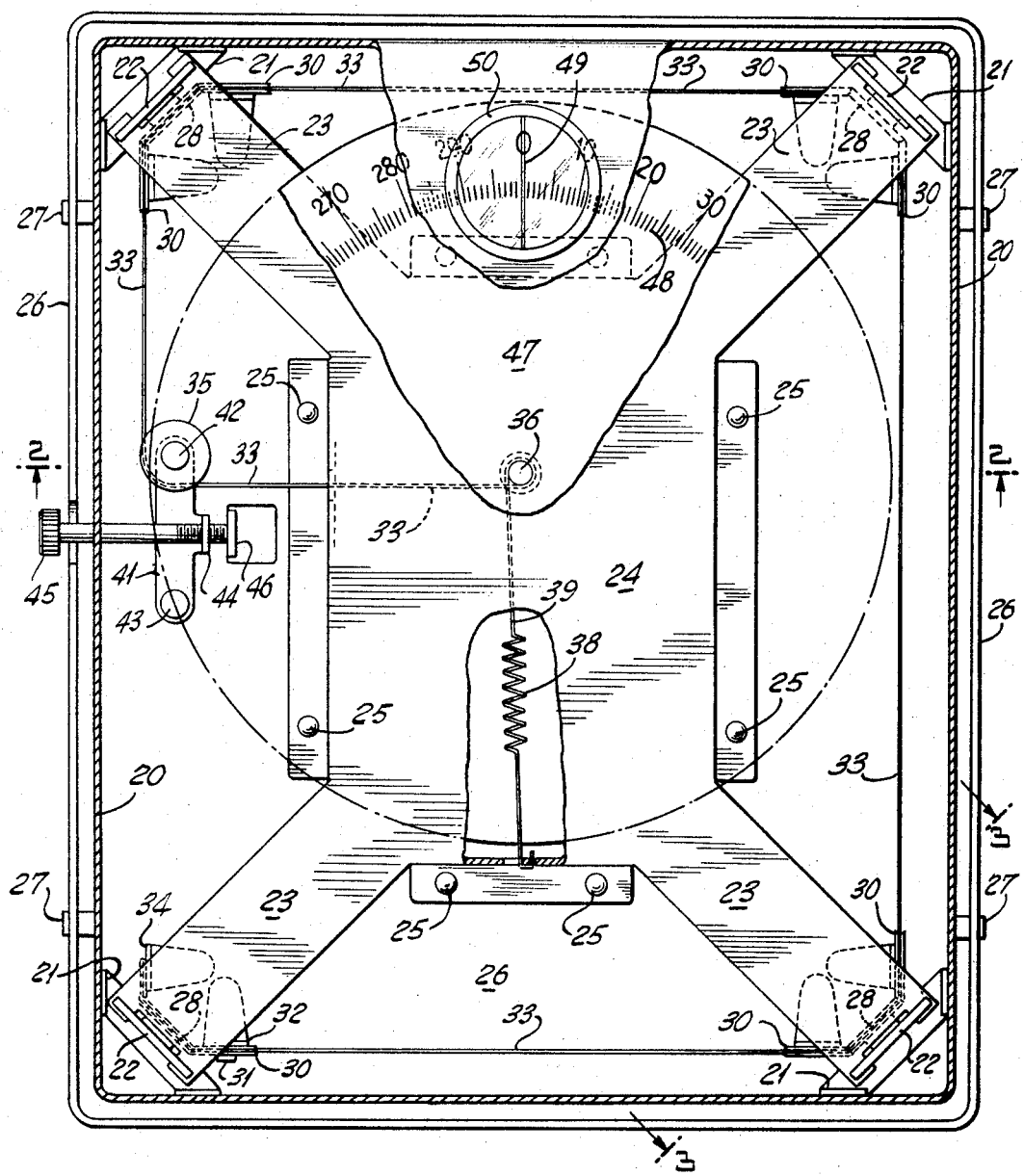
FIGURE 1 is a plan view of the preferred floor platform form of the invention in which the top surface of the weighing platform and part of the indicator dial have been broken away to reveal the underlying mechanism.

Referring to the drawings, a weighing platform 20 is provided preferably drawn from sheet metal in the form of an inverted pan, and adapted to be stood upon for self weighing. Platform 20 is provided with a diagonal shelf 21 at each corner of its skirt from which platform 20 is suspended by four I shaped metal knife-edge links 22.

Each of the four links 22 hangs from a notch in the end of a horizontal cantilever beam 23, each of which is an integral part of the sheet metal central fixed platform 24, which, in turn, is secured by rivets 25 to a drawn metal base pan 26.

Four tabs 27 bent out from the skirt of platform 20 engage corresponding slots in the lip of base pan 26 so that platform 20 is limited in its motion away from pan 26, but, by the depth of the said slots, is allowed to move freely towards pan 26 during a weighing operation as beams 23 deflect under load.

The overhanging knife edge surfaces at each end of links 22 are provided with corresponding V shaped grooves in the cantilever arms 23 from which they hang, and in the platform shelf 21 which they support.

This knife edge suspension compensates for the slight lateral motion experienced by the ends of beams 23 as they deflect under load.

Each link 22 is provided with a grooved pulley 28 journalled thereto by a pivot stud 29. These four pulleys thus form a set of movable pulleys each attached to platform 20 at a point near its supporting links 22.

A second set of stationary pulleys 30 is secured to and journalled by pivot studs 32 on tabs 31 bent up from and integral with the base pan 26.

The location of pulleys 30 on pan 26 is designed to be such that the vertical tangents to pulleys 28 will also be tangent to the groove in any pulley 30.

For this reason a taut filament threading all of the pulleys 28 and 30 serially will experience a change in length proportional to the sum of the vertical components of deflection of all the beams 23.

Such a taut filament is provided in the form of a wire 33 preferably made of "Invar," which is a metal having a negligible coefficient of thermal expansion, so as to make the device insensitive to temperature. This elongated, flexible, inextensible, threading member 33 is attached at one end to the base 26 by a tab 34 which is located so that the point of attachment lies in a vertical tangent to the adjacent pulley 28. Thence it passes counterclockwise (FIGURE 1) over a circuit including all of the remaining pulleys 30 and 28. Wire 33 then passes over a zero adjustment pulley 35 and through an aperture in platform 24 to terminate on and wrap around a dial shaft 36. Wire 33 is secured to shaft 36 through a hole 37 therein after wrapping in a counter clockwise direction (FIGURE 1) for at least one turn. Shaft 36 is journalled between platform 24 and base pan 26, and is provided with a tension spring 38 attached to platform 24 at one end and at the other end to a cable 39 which wraps around clockwise (FIGURE 1) and secures to shaft 36 at a hole 40. Spring 38 thus provides a substantially constant torque on shaft 36 tending to take up all slack in summing wire 33 by providing a constant tension therein.

Adjustment pulley 35 is mounted and journalled on a lever 41 by means of a stud 42. Lever 41 is in turn journalled on base pan 26 by a stud 43. Lever 41 is also provided with a tab 44 having a threaded hole into which a threaded adjustment knob 45 is threaded until it abuts against a stop tab 46 bent up from base pan 26.

The tension on wire 33 produces a clockwise torque on lever 41 thereby causing the threaded end of screw knob 45 to press against tab 46. When zero adjust knob 45 is turned it effectively changes the length of the wire circuit, thereby permitting the indicator associated with shaft 36 to be adjusted to zero when there is no load on platform 20.

At its upper end, shaft 36 has secured to it a dial plate 47 which has a weight scale 48 engraved around its periphery. An index marker 49 engraved on a transparent card (not shown) is secured to platform 24 so as to indicate the scale's reading without parallax. A plastic transparent window 50 in platform 20 is provided to reveal and magnify the resultant reading.

In operation, the subject to be weighed steps on to platform 20 so that his center of gravity lies somewhere in the projected area bounded by the suspension links 22. Depending on this location the total weight of the subject will be arithmetically distributed between the four links 22, and in this same proportion the corresponding beams 23 will be deflected downward. The sum total of these deflections will then be gathered by a displacement of wire 33, thereby allowing shaft 36 and dial 47 to rotate under the torque of spring 38 until all slack is taken up.

The reading in window 50 will then be a measure of the weight on platform 20 regardless of its exact location on platform 20.

It is to be noted that the pulley system at each corner has the property of causing a displacement of wire 33 which is twice the physical displacement of the corresponding beam 23. If it were desired, more pulleys could be added to further multiply this extension.

What is claimed is:
1. A weighing device comprising: a platform; a plurality of springs supporting said platform at a corresponding plurality of points on said platform; a frame for supporting said springs; a first plurality of pulleys each attached to said platform at a location adjacent to one of said support points; a second plurality of pulleys attached to said frame at locations such that a vertical tangent to each of said second plurality of pulleys is also tangent to one of said first plurality of pulleys; an elongated flexible inextensible member forming a circuit threading each of the pulleys of both said first plurality of pulleys and of said second plurality of pulleys; means to maintain substantially constant tension on said threading member; and means to indicate the amount of motion of one end of said threading member in response to the imposition of a weight load on said platform.

2. In a weighing device in accordance with claim 1 said plurality of springs comprising cantilever springs all formed from a single sheet of metal.

3. In a device in accordance with claim 1 said threading member being secured at one end to said frame.

References Cited

UNITED STATES PATENTS

| | | | |
|---|---|---|---|
| 1,692,102 | 11/1928 | Weber | 177—170 |
| 2,649,294 | 8/1953 | Walter | 177—229 |
| 2,960,329 | 11/1960 | Hanssen | 177—168 |

ROBERT S. WARD, JR., *Primary Examiner.*

LAWRENCE H. HAMBLEN, *Assistant Examiner.*